(12) United States Patent
Krishnaswamy et al.

(10) Patent No.: US 7,826,397 B2
(45) Date of Patent: Nov. 2, 2010

(54) METHOD AND SYSTEM FOR DETERMINING A NETWORK TOPOLOGY

(75) Inventors: Murali Krishnaswamy, Piscataway, NJ (US); Sambasiva R. Bhatta, Tampa, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 739 days.

(21) Appl. No.: 11/617,257

(22) Filed: Dec. 28, 2006

(65) Prior Publication Data

US 2008/0159173 A1    Jul. 3, 2008

(51) Int. Cl.
*H04Q 3/06* (2006.01)
(52) U.S. Cl. .................. 370/255; 709/220; 709/223; 709/241
(58) Field of Classification Search .................. 370/238, 370/255, 386, 254; 709/220, 241
See application file for complete search history.

(56) References Cited

U.S. PATENT DOCUMENTS

| | | | | |
|---|---|---|---|---|
| 5,546,542 | A * | 8/1996 | Cosares et al. | 709/241 |
| 6,798,752 | B1 * | 9/2004 | Pope | 370/254 |
| 2002/0036988 | A1 * | 3/2002 | Cardwell et al. | 370/238 |
| 2003/0055918 | A1 * | 3/2003 | Zimmel et al. | 709/220 |
| 2005/0122968 | A1 * | 6/2005 | Raza et al. | 370/386 |

* cited by examiner

*Primary Examiner*—Dang T Ton
*Assistant Examiner*—Lionel Preval (57) ABSTRACT

Various embodiments of the present invention are directed to a method for creating a DWDM optical fiber network topology based on a set of demands associated with a region of interest. The demands may be placed on one or more rings in a DWDM optical fiber network based on several Evaluation Function (EF) parameters, which may include Ring COI calculations. EF parameters may include without limitation: (1) a preference for a ring topology solution or partial solution that considers (e.g., routed or skipped) as many demands as possible; (2) a preference for a ring topology solution or partial solution that skips the fewest number of demands; (3) a preference for a ring topology solution or partial solution that produces the highest Ring COI value; and/or (4) a preference for a ring topology solution or partial solution that provides, on average, the fewest number of node hops, i.e., the fewest number of intermediate nodes along various paths between endpoints.

21 Claims, 3 Drawing Sheets

METHOD AND SYSTEM FOR DETERMINING A NETWORK TOPOLOGY

BACKGROUND OF THE INVENTION

Optical fiber network planning refers to a broad spectrum of activities including determining where, when and how much new optical network capacity, i.e., carrier facilities, must be established or added to the network in order to meet a demand for services through the network. More particularly, network service providers must perform technology selection, equipment sizing, traffic grooming and routing, cost analysis, and other related operations.

The United States telecommunications industry currently relies largely on a synchronous optical networking technology known as a Synchronous Optical Network ("SONET"). SONET is referred to as synchronous technology because the exact rates that are used to transport data are tightly synchronized across the entire network by atomic clocks. This allows for a significant reduction in the amount of buffering required between each element of the network when compared to asynchronous optical fiber technologies. In addition, unlike asynchronous technologies that only connect two points in a direct link, SONET allows several points to be connected in multiple types of architectures, e.g., a ring, mesh or grid, etc. These architectures are desirable because they are "self-healing" in the event that a fiber optic cable is cut.

A second developing synchronous optical networking technology that also uses the above "self-healing" architectures is called Dense Wavelength Division Multiplexing ("DWDM"). In DWDM, multiple colors of light are passed through a single fiber optic strand thus permitting multiple signals through that fiber strand. This increases the capacity of each fiber optic strand as compared to prior network technologies such as SONET. DWDM networks also allow individual wavelengths of light to carry different types of data traffic, such as for example, SONET traffic, Ethernet traffic, Fibre Channel, etc. DWDM wavelengths can also carry traffic at different rates, such as for example, OC-48 (2.5 Gbps), OC-192 (10 Gbps), etc. DWDM networks need not be terminated (i.e., converted from optical signals to electrical signals and then back again) at intermediate optical network nodes as is required by prior technologies such as SONET.

Various methods have been developed for determining the topology or structure of a SONET and/or DWDM optical fiber network. For example, one method is disclosed in commonly-owned U.S. Pat. No. 6,798,752, which is entitled Method and System for Determining Network Topology and is incorporated by reference herein in its entirety.

Given the many benefits and increasing demand for DWDM network technologies, it would be desirable to provide additional methods for determining DWDM network topologies and more particularly, to provide methods and systems for optimizing the structure of such systems based on the traffic expected or intended to be supported by such systems.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Various embodiments of the present invention are directed to a DWDM network planning tool, system, and method for creating, servicing, and optimizing a DWDM optical fiber network that is configured to service a set of demands associated with a region of interest. As will be apparent in the art in view of this disclosure, the tools, systems, and methods recited herein may be used by DWDM network planners or service providers to configure or setup new DWDM optical fiber networks. Such tools, systems, and methods may also be used when planning for growth of existing optical fiber networks and/or optimizing capacity utilization.

DWDM fiber strands transmit data by passing optical signals comprised of multiple colors of light at discrete wavelengths within a designated frequency band. The optical signals undergo multiplexing whereby multiple optical signals are transformed at a transmitting end into a single complex signal and then recovered into separate signals at a receiving end. For purposes of the present specification and appended claims the term "DWDM" shall include a variety of multiplexing technologies including without limitation wavelength division multiplexing, coarse wavelength division multiplexing, dense wavelength division multiplexing, and re-configurable optical add/drop multiplexing as are known in the art.

Optical signals may be added or dropped from a DWDM network at nodes having at least one optical add/drop multiplexer ("OADM"). A connection between two OADMs is referred to as a lightpath (also commonly referred to as an "Optical Channel connection"). As discussed in greater detail below, multiple lightpaths may exist between two OADMs and a single demand tributary of a given traffic rate may traverse multiple lightpaths on different wavelengths. Further, multiple demand tributaries of a given traffic rate may be combined to traverse a selected lightpath.

DWDM network architectures are established by DWDM network service providers to allow customers the ability to transmit data from one geographic location to another. Customers may select a traffic rate or bit rate for such transmissions (e.g., DS0, DS3, OC01, OC03, OC12, GigE, OC192, etc.) or the nature of the data may dictate a lowest acceptable traffic rate (e.g., telephone, video conference services, etc.). Traffic between nodes is referred to herein as a "demand" or as a "set of demands." Demands typically include a source node, a destination node, a traffic rate, and a protection scheme. Source and destination nodes may be referred to in the present application and appended claims as "endpoints."

DWDM network service providers offer customers multiple protection schemes on a per wavelength basis. Such protection schemes may include traditional SONET protection schemes (e.g., UPSR, 2BLSR, etc.) or optical protection schemes. Optical protection schemes include dedicated protection ring protection ("DPRING protection") and optical shared protection ring protection ("OSPRING protection").

DWDM network planners establish regional DWDM network architectures (e.g., one or more ring networks) based on a set of demands associated with a selected geographic region or "region of interest." This set of demands includes multiple discrete customer demands having source and/or destination locations within the region of interest. As described in detail below, various embodiments of the invention are directed to computer-implemented methods for using these customer demands to formulate an optimal DWDM network topology.

As described in detail below, various embodiments of the present invention are directed to method for placing a set of demands on one or more DWDM ring networks comprising the following steps: (1) receiving a set of demands within a queue; (2) calculating a Demand Community of Interest (COI) for each demand in the queue; (3) identifying the demand having the largest Demand COI; (4) placing the demand having the largest Demand COI on a new DWDM ring network; (5) calculating the Aggregate COI for each demand remaining in the queue; (6) identifying the demand having the largest Aggregate COI; (7) checking the identified demand for common endpoints against demands previously placed on DWDM ring networks (i.e., previously routed demands); (8) skipping the identified demand if no endpoints are shared with previously routed demands; (9) calculating Ring COI values for the identified demand if endpoints are shared with previously routed demands; (10) placing the identified demand on a DWDM ring network based at least in part on a largest Ring COI value subject to additional Evaluation Function parameters; (11) repeating steps (5) through (10) until all demands are either routed or skipped; (12) placing skipped demand having largest Aggregate COI on a ring based at least in part on a Distance Calculation; (13) repeating steps (5) through (10) until all demands are either routed or skipped; and (14) repeating steps (12) and (13) until all skipped demands are routed.

Figure 1:
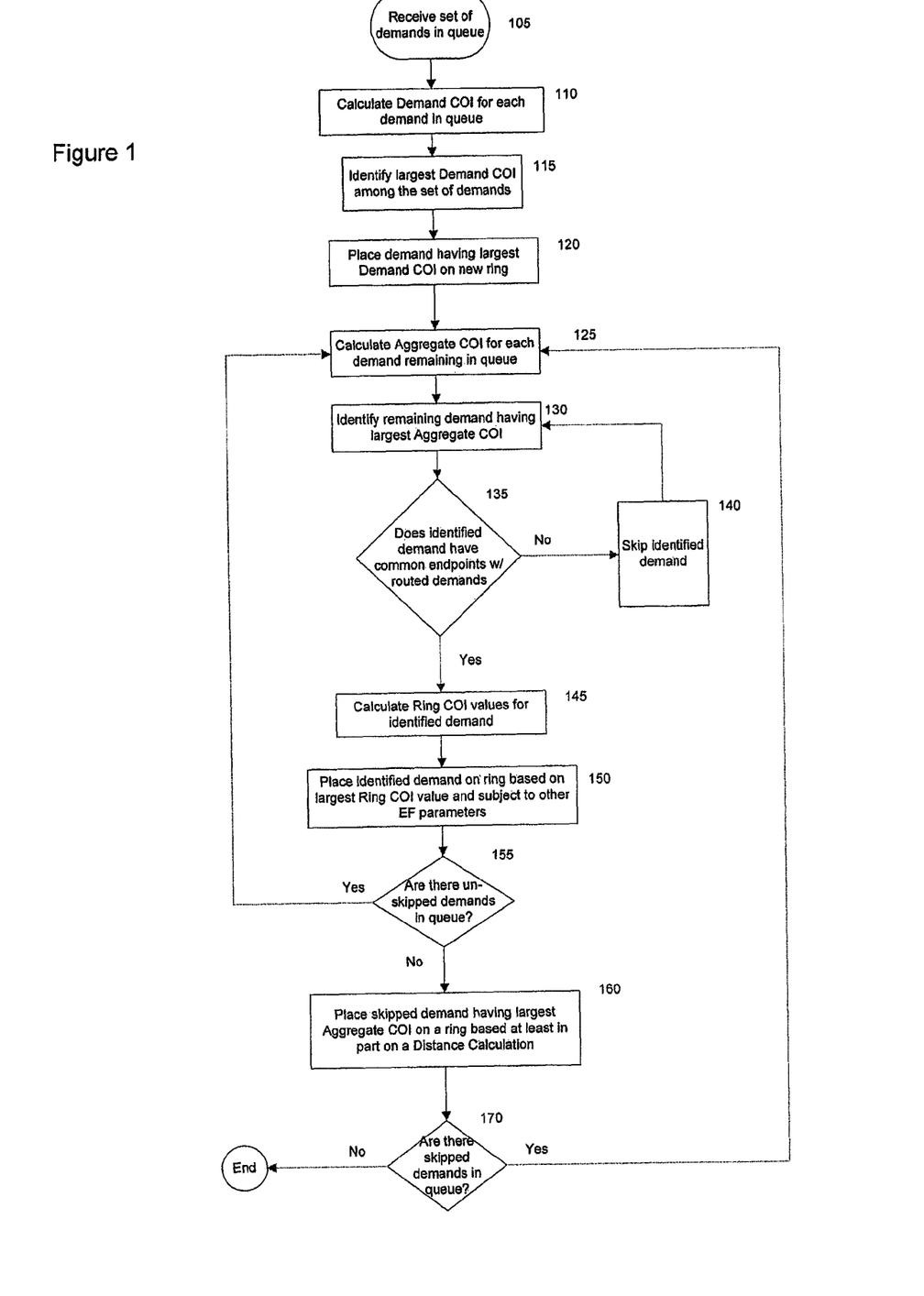
FIG. 1 is a schematic flow diagram illustrating a method for creating an optical network topology in accordance with one embodiment of the invention.

FIG. 1 is a process flow diagram illustrating a method for placing a set of demands on one or more DWDM ring networks in accordance with one embodiment of the invention. The depicted method begins by considering a set of demands within a region of interest. In various embodiments, the set of demands are placed in a queue for processing or routing on one or more DWDM ring networks. In various embodiments, these demands are evaluated against one another based on a community of interest value (COI). Multiple COI values exist (e.g., Demand COI, Aggregate COI, Ring COI), however, each attempts generally to quantify a pattern of communication between two nodes or a plurality of nodes within possible ring network solutions as described in greater detail below.

The depicted method begins at step 105 where a set of demands are received in a queue. Step 110 involves calculating a Demand COI for each demand in the queue. The Demand COI between a set of points in a network is a score based on either an established, or an expected, pattern of communication among those points. The Demand COI is a function of a demand quantity for a demand, a distance between endpoints of the demand, and a number of endpoints that the demand has in common with other demands in a set of demands. More particularly, the Demand COI is a function of the weighted demand (k) for a given demand, which can be expressed as follows:

$$k = \text{demand quantity}/(2*(\text{distance between endpoints})^2)$$

Each traffic rate (e.g., 18 OC03, 14 OC48, etc.) listed in a set of demands includes a quantity (i.e., 18) and a rate (i.e., OC03). The "quantity" or "demand quantity" corresponds to the number of data streams needed at a particular traffic rate to service a set of demands. Notably, in one embodiment, each demand within a set of demands is converted or normalized to a common traffic rate based on the conversion information provided in Table 1 below before the demand quantities or such demands are considered for purposes of determining the Demand COI. In one embodiment, for example, the demands are normalized in an OC48 traffic rate format. In other embodiments, the demands associated with a node pair may be normalized in a traffic rate other than OC48 (e.g., OC03, OC12, etc.).

TABLE 1

| Optical Traffic Rate | Number Needed | Equivalent Opt. Traffic Rate |
|---|---|---|
| DS0 | 24 (or part thereof) | =DS1 |
| DS1 | 28 (or part thereof) | =DS3 |
| DS3 | 3 (or part thereof) | =OC03 |
| OC01 | 3 (or part thereof) | =OC03 |
| OC03 | 16 (or part thereof | =OC48 |
| OC12 | 4 (or part thereof) | =OC48 |
| GigE | 2 (or part thereof) | =OC48 |
| OC192 | 1 | =4 OC48 |
| OC768 | 1 | =16 OC48 |

When computing the Demand COI for a single demand ($d_1$):

$$COI_{d_1} = 1.1*k(d_1) = 1.1*[\text{demand quantity}_{d_1}/(2*(\text{distance between endpoints})^2)]$$

For example, let us assume that $d_1$ is a demand provided between nodes A and B, which are 5 miles apart. If the normalized demand of $d_1$ is 14 OC48, then $COI_{d_1}$ equals $1.1*[14/(2*25)]$ or 0.308.

When considering multiple demands ($d_1$, $d_2$, $d_3$, $d_4$, $d_5$) within a demand set, step 110 requires that the Demand COI for each demand be computed using the weighted demand value provided above. Once complete, the Demand COI values for each demand are compared at step 115 and the demand having the highest Demand COI value is considered first for placement on a DWDM ring network at step 120. Let us assume, for example, that $d_1$ has the highest COI value. Let us also assume that no other rings have yet been established for this region of interest and, thus, $d_1$ is placed at step 120 on a hypothetical ring of its own.

Next, at step 125, an Aggregate COI value is calculated for each remaining demand in the queue. The Aggregate COI value for each demand is a numerical value representing various possible placements for each demand within a hypothetical DWDM ring network. Turning to one of the remaining demands provided in the example set forth above, let us say $d_2$, we note that there are two possible choices for placement of $d_2$: (1) $d_2$ may be placed on a ring of its own or (2) $d_2$ may be placed on the hypothetical ring established for di. The Aggregate COI ($COI_{ag}$) is the sum of the Demand COI values for each of these two possible choices as expressed below.

$$COI_{ag} = COI(\text{choice 1}) + COI(\text{choice 2})$$

where COI (choice 1)=$COI_{d2}$=1.1*k($d_2$) representing $d_2$ being placed on its own ring, and COI (choice 2)=n*k($d_2$)+n*k($d_1$) representing $d_2$ being placed on a ring with $d_i$.

In the above expression, the value n is dependant on the number of endpoints shared between $d_2$ and $d_1$. In particular, the value n may be expressed as follows:

n=2 if $d_1$ and $d_2$ have one endpoint in common (e.g., the same source node);

n=3 if $d_1$ and $d_2$ have both endpoints in common; and n=1 if $d_1$ and $d_2$ share no common endpoints.

The above calculation is readily illustrated by way of an example. If we assume that $d_1$ has the demand values set forth above and $d_2$ is a demand provided between nodes B and C, which are 3 miles apart, and includes a traffic rate of 6 OC48, then the aggregate COI for $d_2$ may be expressed as follows:

$$COI(d_2)_{ag}=COI_{d2}+n*k(d_2)+n*k(d_1)$$

we note that $d_2$ and $d_1$ share one common endpoint (B) and, thus, n=2.

$$COI(d_2)_{ag}=1.1*[6/(2*9)]+2*[6/(2*9)]+2*[14/(2*25)]$$

$$COI(d_2)_{ag}=0.367+0.667+0.560=1.594$$

Once the Aggregate COI for each of the remaining demands has been computed, the aggregate COI values are compared and the demand having the highest aggregate COI value is identified at step 130 and considered for placement in the DWDM ring network.

To better illustrate steps 135-145, let us assume that $d_4$ has the highest Aggregate COI value among the set of demands $d_2$, $d_3$, $d_4$, $d_5$. Let us further assume that, as noted above, $d_1$ has already been placed on a hypothetical ring of its own. In one embodiment, demand $d_4$ may be skipped (i.e., returned to the queue) at step 140 as described in greater detail below or may be used as the basis for Ring COI calculations at step 145. Assuming for the moment that $d_4$ is not skipped, there are two possible choices for placement of $d_4$: (1) $d_4$ may be placed on a ring of its own or (2) $d_4$ may be placed on a ring with di. In various embodiments of the invention, $d_4$ may be placed on a ring associated with either choice 1 or choice 2 based, at least in part, on a Ring COI ($COI_{ring}$) value calculated for each of these choices. Ring COI values may be expressed as follows:

$$COI(\text{choice 1})_{ring}=1.1*k(d_4)+1.1*k(d_1)$$

$$COI(\text{choice 2})_{ring}=n*k(d_4)+n*k(d_1)$$

where n is either 1, 2, or 3 based on the number of endpoints shared by $d_1$ and $d_4$ as discussed above.

Once ring COI values have been calculated for each choice at step 145, $d_4$ may be placed at step 150, subject to other Evaluation Function (EF) parameters described below, on the ring associated with the choice having the highest Ring COI value. For example, if COI(choice 1)$_{ring}$=3 and COI(choice 2)$_{ring}$=5, then $d_4$ would be placed, subject to the other EF parameters, on a ring with $d_1$.

In accordance with various embodiments of the invention, as noted above, demands may be placed on one or more rings in a DWDM optical fiber network based on several Evaluation Function (EF) parameters, which may include Ring COI calculations. The EF parameters are indicative of a value of a potential ring topology solution. EF parameters may include without limitation: (1) a preference for a ring topology solution or partial solution that considers (e.g., routed or skipped) as many demands as possible; (2) a preference for a ring topology solution or partial solution that skips the fewest number of demands; (3) a preference for a ring topology solution or partial solution that produces the highest Ring COI value; and/or (4) a preference for a ring topology solution or partial solution that provides, on average, the fewest number of node hops, i.e., the fewest number of intermediate nodes along various paths between endpoints.

In various embodiments of the present invention, DWDM network planners may establish relative priorities between the above EF parameters. For example, in one embodiment, the highest Ring COI (parameter 3) may be established as having the top priority with the remaining parameters being used to break a tie in circumstances where two or more solutions or partial solutions produce identical Ring COI values. Alternatively, in other embodiments, any of the other parameters 1, 2, or 4 may be established as having the top priority with parameter 3 being used only to break ties.

As will be apparent in view of this disclosure, applying EF parameters as described above to a set of demands within a region of interest may result in a DWDM network having one or more rings. Such networks may fall into one of the classes listed below.

Class A: A single ring passing through one or more nodes, for example, a ring passing through nodes A-B-C-D.

Class B: One or more rings that are identical to, or subsets of, another ring. For example, a hypothetical network may be comprised of two rings passing through identical nodes A-B-C-D. In another example, a hypothetical network may be comprised of one ring passing through nodes A-B-C-D and one ring passing through nodes A-B-C.

Class C: Two or more rings that have some nodes in common. For example, a hypothetical network may be comprised of one ring passing through nodes A-B-C-D and one ring passing through nodes A-B-D.

Class D: Two or more rings that have no nodes in common. For example, a hypothetical network may be comprised of one ring passing through nodes A-B-C and one ring passing through nodes D-E-F.

In DWDM optical fiber network applications (and some SONET optical fiber network applications), the add/drop multiplexer technology selected to support the operation of nodes within the network may depend, at least in part, on which of the above classes the network most resembles. For example, optical add/drop multiplexers (OADMs) used in DWDM networks currently support only one DWDM ring network. Thus, in order to support a Class B or Class C DWDM network, at least two OADMs may be required per node. OADMs represent a significant portion of the infrastructure-related costs associated with a DWDM optical fiber network and, thus, it is desirable to reduce the overall number of OADMs needed. As will be apparent, the number of OADMs may be reduced by reducing the number of rings established for a DWDM optical fiber network.

Returning to FIG. 1, the number of rings established within a DWDM optical fiber network may be reduced by comparing, at step 135, endpoints of a demand identified as having the highest Aggregate COI against endpoints for all demands previously placed on DWDM ring networks (i.e., previously routed) to determine whether the identified demand shares endpoints with such previously routed demands. In the depicted embodiment, if the identified demand does not share one or more endpoints in common with previously routed demands, then regardless of its status as demand having the highest Aggregate COI value, the identified demand is skipped at step 140, i.e., the identified demand is placed back in the queue.

If a demand having the highest Aggregate COI value is skipped, the method returns to step 130 where the demand having the next highest Aggregate COI value is identified. Once again, the endpoints of this newly identified demand are compared against those of the previously routed demands at step 135. If the newly identified demand has endpoints in common with any previously routed demands, then the Ring COI values for the newly identified demand are calculated at step 145 and the demand is placed on a DWDM ring network at step 150. If the newly identified demand does not share endpoints in common with one or more previously routed demands, then it is skipped (i.e., returned to the queue) at step 140. The process then returns to step 130 and the demand having the next highest Aggregate COI is identified. In various embodiments of the invention, this process continues until all demands have been routed or until it has been determined that none of the remaining demands share endpoints in common with any previously-routed demand.

As will be apparent, endpoint comparison step 135 operates to push demands having no endpoints in common with previously routed demands to the end of the queue. In some circumstances, this may desirably operate to limit the number of rings established in a DWDM network (i.e., by moving to the end of the list such demands are more likely to have endpoints in common with routed demands). For example, let us consider Class B above (i.e., ring A-B-C is a subset of ring A-B-C-D) and Class C above (i.e., ring A-B-D shares nodes in common with ring A-B-C-D). Let us assume that a demand C-D has the highest Aggregate COI value in both Class B and C and, thus, would be routed first. Let us further assume that demand A-B, despite having no common endpoints with C-D, has the next highest Aggregate COI. Without step 135, Ring COI calculations for demand A-B would likely suggest that it be placed on a DWDM ring network that is separate from demand C-D. However, by incorporating endpoint comparison step 135, demand A-B would be skipped and put back into the queue. Another demand would then be selected (e.g., A-C, A-D, B-C or B-D) and the Ring COI for such demand would likely suggest routing onto the ring previously selected for C-D. When demand A-B is taken up again after other non-skipped demands have been routed in accordance with various embodiments of the invention, it is more likely that demand A-B will share a node in common with one or more of the previously routed non-skipped demands (e.g., A-C, A-D, B-C or B-D) and, thus, would be placed on a ring with such demands. Accordingly, a second ring is avoided thereby reducing necessary OADM costs.

Returning to the example discussed above, we recall that $d_4$ was placed on a ring based at least in part on its Ring COI value. In one embodiment, once $d_4$ was placed, the Aggregate COI for the remaining un-routed demands (e.g., $d_2$, $d_3$, $d_5$) is again computed at step 125. Selecting for example demand $d_3$, we note that the Aggregate COI of $d_3$ may be expressed, depending upon the placement of $d_4$ relative to d, in terms of four possible choices: 1) $d_3$ could be placed on a ring of its own; 2) $d_3$ could be placed on a ring shared by $d_1$ and $d_4$ (assuming $d_4$ was placed on a ring with $d_1$); 3) $d_3$ could be placed on a ring with $d_1$ (assuming $d_4$ and $d_1$ were placed on separate rings); or 4) $d_3$ could be placed on a ring with $d_4$ (assuming $d_4$ and $d_1$ were placed on separate rings). Notably, for illustration purposes, these choices are provided in view of various possible choices for the placement of $d_4$ relative to $d_1$. In practice, the Ring COI values for the placement of $d_4$ would dictate that one choice was preferred as to the other and $d_4$ would be positioned before calculating the Aggregate COI of $d_3$.

In continuing with our example, we note that if $d_4$ were placed on a ring of its own relative to d, the Aggregate COI of $d_3$ could be expressed as follows:

$$COI(d_3)_{ag}=COI_{d3}[\text{represents } d_3 \text{ positioned on its own ring}]+n_{3\text{-}1}*k(d_3)+n_{3\text{-}1}*k(d_1) \text{ [represents } d_3 \text{ positioned on } d_1\text{'s ring]}+n_{3\text{-}4}*k(d_3)+n_{3\text{-}4}*k(d_4) \text{ [represents } d_3 \text{ positioned on } d_4\text{'s ring]}$$

where $n_{3\text{-}1}$ is based on the number of endpoints shared between $d_3$ and $d_1$, and $n_{3\text{-}4}$ is based on the number of endpoints shared between $d_3$ and $d_4$.

Alternatively, if $d_4$ were placed on a ring with $d_1$, the Aggregate COI of $d_3$ could be expressed as follows:

$$COI(d_3)_{ag}=COI_{d3}[\text{represents } d_3 \text{ positioned on its own ring}]+n_{3\text{-}1\text{-}4}*k(d_3)+n_{3\text{-}1\text{-}4}*k(d_1)+n_{3\text{-}1\text{-}4}*k(d_4)[d_3 \text{ on shared } d_1/d_4 \text{ ring}]$$

where $n_{3\text{-}1\text{-}4}$ is based on the number of endpoints shared by $d_3$, $d_1$, and $d_4$.

Once an Aggregate COI for $d_3$ has been computed, aggregate COI's for $d_2$ and $d_5$ are calculated at step 125 and these values are compared at step 130. In accordance with various embodiments of the invention, the demand having the highest Aggregate COI is considered next for placement on rings of the DWDM network. For example, let us assume that $d_3$ has the highest Aggregate COI of the remaining demands. Let us also assume that $d_3$ shares endpoints with previously routed demands and, thus, is not skipped. Turning to step 145, the ring COI for $d_3$ may be expressed in terms of five possible choices: (1) $d_3$ could be placed on a ring of its own (assuming $d_4$ and $d_1$ are on separate rings); (2) $d_3$ could be placed on its own (assuming $d_4$ and $d_1$ are on the same ring); (3) $d_3$ could be placed on a ring shared by $d_1$ and $d_4$ (assuming $d_4$ was placed on a ring with $d_1$); (4) $d_3$ could be placed on a ring with $d_1$ (assuming $d_4$ and $d_1$ were placed on separate rings); or (5) $d_3$ could be placed on a ring with $d_4$ (assuming $d_4$ and $d_1$ were placed on separate rings). As noted above, for illustration purposes, these choices are provided in view of various possible choices for the placement of $d_4$ relative to $d_1$. In practice, the Ring COI values for the placement of $d_4$ would dictate that one choice was preferred as to the other and $d_4$ ewould be positioned before calculating the ring COI of $d_3$.

In various embodiments of the invention, $d_3$ is placed on rings associated with either of choices 1 through 5 based, at least in part, on a Ring COI ($COI_{ring}$) value calculated for each of these choices at step 145. The Ring COI values for $d_3$ may be expressed as follows:

$$COI(\text{choice 1})_{ring}=1.1*k(d_3)+1.1*k(d_1)+\mathbf{1.1}*i\, k(d_4)$$

$$COI(\text{choice 2})_{ring}=1.1*k(d_3)+n_{1\text{-}4}*k(d_1)+n_{1\text{-}4}*k(d_4)$$

where $n_{1\text{-}4}$ is 1, 2, or 3 based on the number of endpoints shared between $d_1$ and $d_4$.

$$COI(\text{choice 3})_{ring}=n_{3\text{-}1\text{-}4}*k(d_3)+n_{3\text{-}1\text{-}4}*k(d_1)+n_{3\text{-}1\text{-}4}*k(d_4)$$

where $n_{3\text{-}1\text{-}4}$ is 1, 2, or 3 based on the number of endpoints shared between $d_3$, $d_1$, and $d_4$.

$$COI(\text{choice 4})_{ring}=n_{3\text{-}1}*k(d_3)+n_{3\text{-}1}*k(d_1)+1.1*k(d_4)$$

where $n_{3\text{-}1}$ is 1, 2, or 3 based on the number of endpoints shared between $d_3$ and $d_1$.

$$COI(\text{choice 5})_{ring}=n_{3\text{-}4}*k(d_3)+1.1*k(d_1)+n_{3\text{-}4}*k(d_4)$$

where $n_{3\text{-}4}$ is 1, 2, or 3 based on the number of endpoints shared between $d_3$ and $d_4$.

Once Ring COI values have been calculated for each choice, $d_3$ is placed, subject to the other EF parameters noted above, on the ring associated with the choice having the highest Ring COI value at step 150.

In the depicted embodiment, once $d_3$ is placed, the process continues to step 155 where it is determined whether any un-skipped demands remain in the queue. In the present example, un-skipped demands $d_2$ and $d_5$ remain in the queue and, thus, the method returns to step 125 as shown in FIG. 1. Aggregate COI values for $d_2$ and $d_5$ are calculated and the demand having the highest aggregate COI is identified at step 130. Once again, this newly identified demand is checked for common endpoints against previously routed demands and, assuming such common endpoints exist, is considered next for placement in the DWDM network. Ring COIs for the various available placement choices for the selected demand are calculated at step 145 and the demand is placed as discussed above. This process continues until all non-skipped demands have been routed.

In accordance with another embodiment of the invention, once all un-skipped demands have been routed, any previously skipped demands remaining in the queue are assessed and the skipped demand having the largest Aggregate COI value is placed on a DWDM ring network at step 160 based, at least in part, on a Distance Calculation. Application of the Distance Calculation to a selected demand may comprise the following steps: identifying nodes associated with the selected demand; determining the two shortest possible links between the nodes of the selected demand and nodes of a closest existing DWDM ring network; ensuring that the two shortest possible links are distinct relative to one another (i.e., do not share common nodes); identifying the longer of the two shortest possible links; determining a total length for the links of the closest existing DWDM ring network; and comparing the total length of the closest existing DWDM ring to the length of the longer of the two shortest possible links. In one embodiment, if the total length of the closest existing DWDM ring network is greater than the length of the longer of the two shortest possible links, then the selected demand is placed on the closest existing ring. Alternatively, if the total length of the closest of existing ring is less than the length of the longer of the two shortest possible links, then the selected demand is placed on a new ring.

Figure 2:
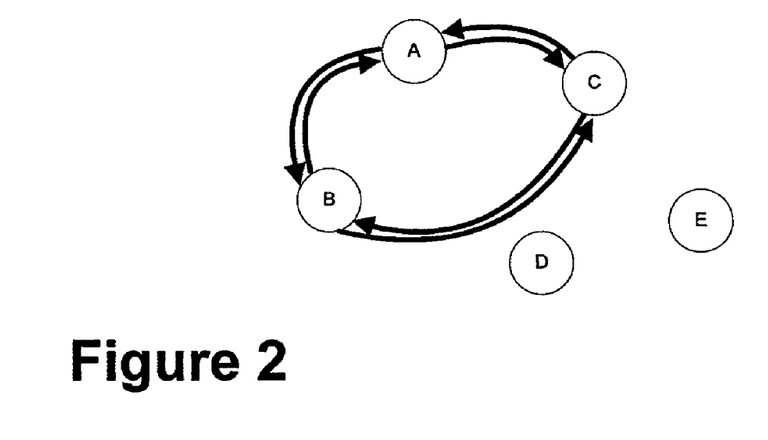
FIG. 2 is a schematic illustration of a partial optical fiber network solution in accordance with one embodiment of the invention.

Application of the above Distance Calculation may be readily illustrated by way of an example. Let us assume that all non-skipped demands were routed using the above EF parameters to define a ring network A-B-C as shown in FIG. 2. Let us also assume that demand provided between nodes D-E was skipped because it did not share endpoints with a previously routed demand. Let us further assume that the physical distances provided between nodes A-B-C-D-E are as set forth in Table 1 below.

|   | A | B | C | D | E |
|---|---|---|---|---|---|
| A | — | 3 miles | 2 miles | 8 miles | 9 miles |
| B | 3 miles | — | 4 miles | 4 miles | 6 miles |
| C | 2 miles | 4 miles | — | 3 miles | 3 miles |
| D | 8 miles | 4 miles | 3 miles | — | 2 miles |
| E | 9 miles | 6 miles | 3 miles | 2 miles | — |

As noted above, the first step in applying the Distance Calculation to demand D-E is to identify nodes associated with the selected demand, namely, D and E. Next, we determine the two shortest possible links between the nodes of demand D-E and the nodes of ring A-B-C (i.e., the closest existing DWDM ring network). The two shortest possible links are link D-C (3 miles) and link E-C (3 miles). However, the next step requires that we ensure that the two shortest possible links are distinct relative to one another (i.e., do not share common nodes). Thus, we replace link D-C with the next shortest link D-B (4 miles). The longer of the two shortest links is link D-B (4 miles). Next, we calculate the total length of the links for ring A-B-C by adding link A-B, link B-C, and link C-A (3 miles+4 miles+2 miles=9 miles). Finally, we compare the total length of the closest existing DWDM ring (9 miles) to the length of the longer of the two shortest possible links (4 miles). In this case, the longer of the two shortest links, link D-B, is shorter than the total length of the existing ring A-B-C and hence the new demand D-E would be placed on the ring A-B-C.

Figure 3:
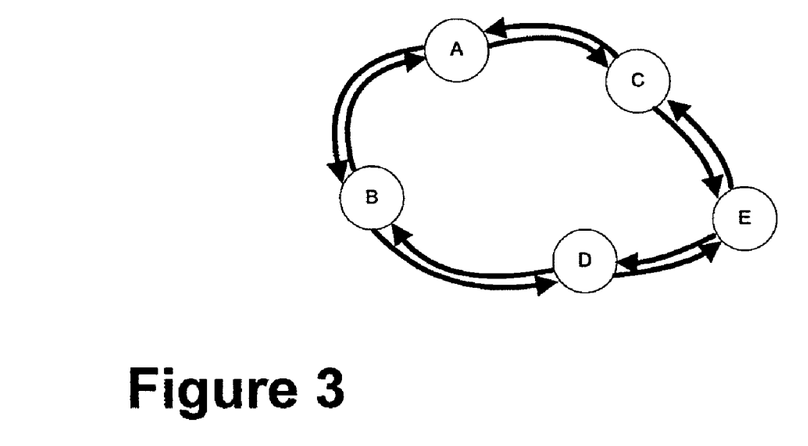
FIG. 3 is a schematic illustration of an optical fiber network solution in accordance with one embodiment of the invention.

In yet another embodiment, once it is determined that demand D-E is to be placed on ring A-B-C, the final ring topology of the ring network passing through nodes A, B, C, D, and E should be determined. For example, it should be determined whether it is preferable for the ring network to be arranged along a path A-B-C-D-E, A-C-E-D-B, etc. In one embodiment, this decision is based on a preference for the lowest total length of the links of the ring. Thus, referring for example to possible rings A-B-C-D-E and A-C-E-D-B, ring network A-C-E-D-B illustrated in FIG. 3 would be preferred as its total length (2 miles+3 miles+2 miles+4 miles+3 miles=14 miles) is less than ring network A-B-C-D-E (3 miles+4 miles+3 miles+2 miles+9 miles=21 miles).

Referring again to FIG. 1, once the skipped demand having the largest Aggregate COI is routed, the queue is checked at step 170 to determine if any other skipped demands remain in the queue. If so, in one embodiment, steps 125 through 155 are repeated until all previously skipped demands are routed or skipped once again. If all remaining demands are skipped once again, the remaining demand having the largest Aggregate COI value is placed on a DWDM ring network at step 160 based, at least in part, on the Distance Calculation described above. The method then proceeds to step 170 and the above-described process continues until all demands have been routed as will be apparent in view of the present disclosure.

Although various embodiments are specifically illustrated and described herein, it will be appreciated that modifications and variations of the present invention are covered by the above teachings and are within the purview of the appended claims without departing from the spirit and intended scope of the invention. For example, while the present invention has been discussed in terms of an optical ring network, it should be noted that the invention is also applicable to optical mesh networks and logical rings over optical mesh networks.

As will be apparent in view of this disclosure, the present invention may be embodied as a computer program product. Accordingly, the present invention may take the form of an entirely hardware embodiment, an entirely software embodiment or an embodiment combining software and hardware aspects. Furthermore, the present invention may take the form of a computer program product on a computer-readable storage medium having computer-readable program code means embodied in the storage medium. More particularly, the present invention may take the form of web-implanted computer software. Any suitable computer-readable storage medium may be utilized including hard disks, CD-ROMs, optical storage devices, or magnetic storage devices.

The present invention is described above with reference to various decision criteria, guidelines, and algorithms. It will be understood that each decision criterion, guideline, rule, or algorithm, can be implemented by computer program instructions. These computer program instructions may be loaded onto a general purpose computer, special purpose computer, or other programmable data processing apparatus to produce a machine, such that instructions which are executed on the computer or other programmable data processing apparatus create means for implementing the function or functions specified above.

These computer program instructions may also be stored in a computer-readable memory that can direct a computer or other programmable data processing apparatus to function in a particular manner, such that the instructions stored in the computer-readable memory produce an optical fiber network topology creation method including instruction means that implement the functions specified above. The computer program instructions may also be loaded onto a computer or other programmable data processing apparatus to cause a series of operational steps to be performed on the computer or other programmable apparatus to produce a computer implemented process such that the instructions that execute on the computer or programmable apparatus provide steps for implementing the function specified.

Figure 4:
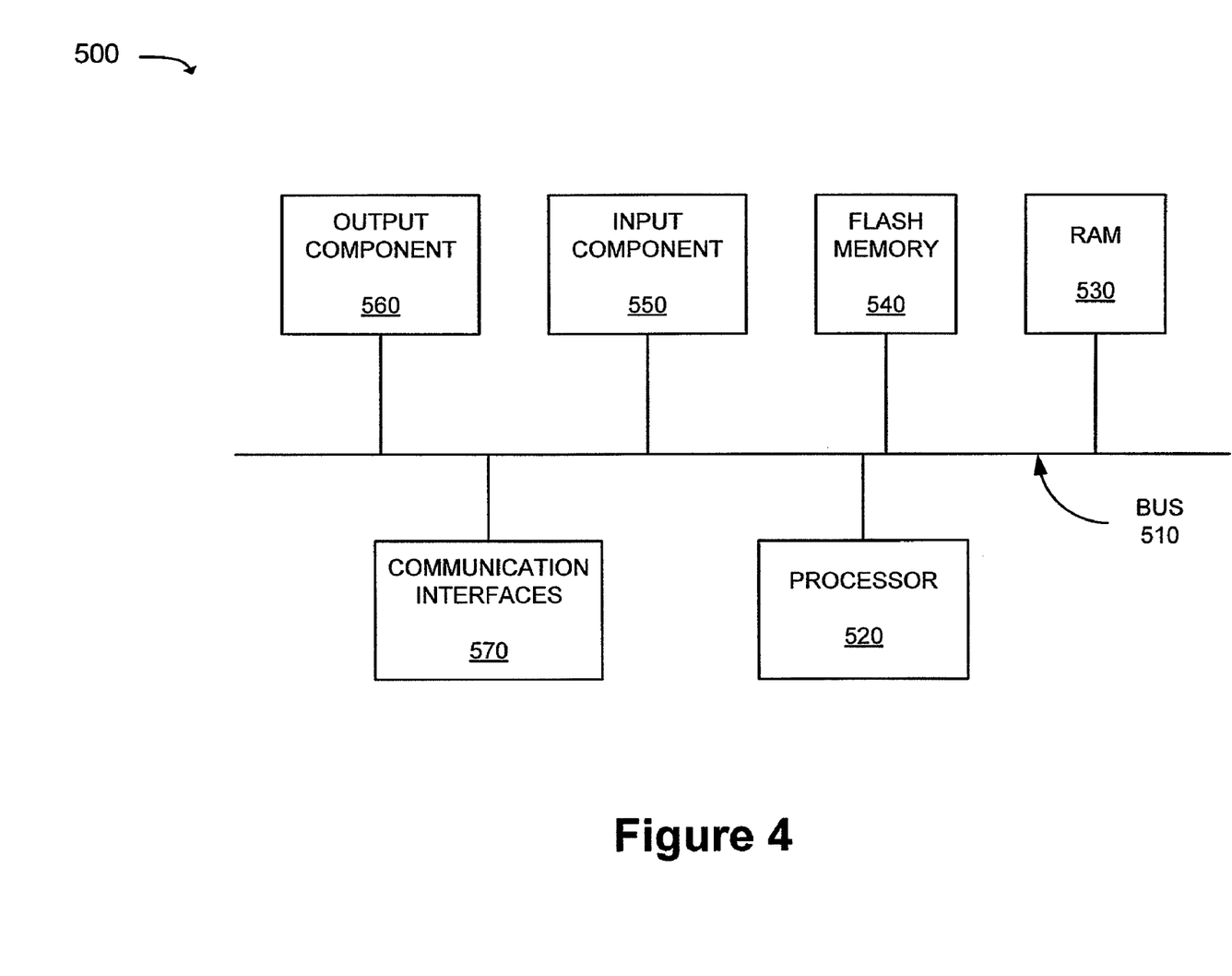
FIG. 4 is a schematic block diagram of an exemplary computer system and apparatus that may be adapted to create an optical fiber network ring topology in accordance with various embodiments of the invention.

FIG. 4 is an exemplary diagram of components for an optical fiber network topology creation apparatus 500 structured in accordance with various embodiments of the present invention. The apparatus 500 may include a bus 510, a processor 520, a random access memory 530, a flash memory 540, an input component 550, an output component 560, and communication interfaces 570. Bus 510 may include a path that permits communication among the elements of the apparatus 500.

Processor 520 may include a processor, microprocessor, or processing logic that may interpret and execute instructions. RAM 530 may include any type of dynamic storage device that may store information and instructions for execution by processor 520. Flash memory 540 may include any type of non-volatile storage device that may store information for use by processor 520.

Input component 550 may include a mechanism that permits an operator to input information to the apparatus 500, such as a button, switch, input key, etc. Output component 560 may include a mechanism that outputs information to the operator, such as a display, one or more light emitting diodes (LEDs), a speaker, a report, a print-out, etc. Communication interfaces 570 may include any transceiver-like mechanisms that enable the apparatus 500 to communicate with other devices and/or systems. For example, communication interfaces 570 may include one or more Ethernet interfaces, optical interfaces, coaxial interfaces, or the like.

As will be apparent in view of the present disclosure, apparatus 500 may perform one or more of the optical fiber network topology creation methods and operations described above. The apparatus 500 may perform these methods and/or operations in response to processor 520 executing software instructions contained in a computer-readable medium, such as RAM 530. A computer-readable medium may be defined as a physical or logical memory device and/or carrier wave.

The software instructions may be read into RAM 530 from another computer-readable medium, such as flash memory 540, or from another device via communication interfaces 570. The software instructions contained in RAM 530 may cause processor 520 to perform processes that will be described later. Alternatively, hardwired circuitry may be used in place of or in combination with software instructions to implement processes described herein. Thus, implementations described herein are not limited to any specific combination of hardware circuitry and software.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for creating an optical fiber network topology, the method comprising:
   receiving to a queue a set of demands comprised of previously routed demands and at least one un-routed demand, each demand of the set of demands comprising endpoints;
   removing the at least one un-routed demand from the queue and comparing endpoints of the at least one un-routed demand against endpoints of the previously routed demands to determine if any common endpoints are present;
   calculating one or more Ring Community of Interest (COI) values for the at least one un-routed demand if common endpoints are present; and
   returning the at least one un-routed demand to the queue if no common endpoints are present.

2. The method of claim 1, further comprising placing the at least one un-routed demand, if common endpoints are present, on an optical fiber network ring based at least in part on the calculated one or more Ring COI values.

3. The method of claim 1, further comprising placing the at least one un-routed demand, if common endpoints are not present, on an optical fiber network ring based at least in part on applying a Distance Calculation to the at least one un-routed demand.

4. The method of claim 3, wherein applying the Distance Calculation comprises determining link distances between the endpoints of the at least one un-routed demand and the endpoints of the previously routed demands.

5. The method of claim 4, wherein determining link distances between the endpoints of the at least one un-routed demand and the endpoints of the previously routed demands comprises selecting two shortest link distances.

6. The method of claim 4, wherein the set of demands comprises zero previously routed demands and at least one un-routed demand.

7. A method for creating an optical fiber network topology, the method comprising:
   receiving into a queue a set of demands comprised of previously routed demands and at least one un-routed demand;
   removing the at least one un-routed demand from the queue and comparing endpoints of the at least one un-routed demand against endpoints of the previously routed demands to determine if any common endpoints are present;
   returning the at least one un-routed demand to the queue if no common endpoints are present; and
   placing the at least one un-routed demand onto an optical fiber network ring based at least in part on Evaluation Function parameters comprising a preference for a ring topology solution or partial solution that results in a highest Ring COI value for the at least one un-routed demand, if at least one common endpoint is present.

8. The method of claim 7, wherein the Evaluation Function parameters further comprise a preference for a ring topology solution or partial solution that considers the highest number of demands from the set of demands.

9. The method of claim 7, wherein the Evaluation Function parameters further comprise a preference for a ring topology solution or partial solution that skips the fewest number of demands from the set of demands.

10. The method of claim 7, wherein the Evaluation Function parameters further comprise a preference for a ring topology solution or partial solution that provides, on average, the fewest number of node hops.

11. A method for creating an optical fiber network topology, the method comprising:
- receiving a set of un-routed demands into a queue, each demand of the set of demands having endpoints;
- calculating a Demand Community of Interest (COI) for each demand in the queue;
- identifying one of the demands having the largest Demand COI;
- placing the demand having the largest Demand COI on a ring of an optical fiber ring network;
- calculating an Aggregate COI for each demand remaining in the queue;
- identifying a demand having the largest Aggregate COI;
- removing the demand having the largest Aggregate COI from the queue and comparing endpoints of the demand having the largest Aggregate COI against endpoints of previous demands associated with the optical fiber ring network to determine if common endpoints are present;
- calculating one or more Ring COI values for the demand having the largest Aggregate COI if common endpoints are present; and
- returning to the queue the demand having the largest Aggregate COI if no common endpoints are present.

12. The method of claim 11, wherein calculating one or more Ring COI values further comprises placing the demand having the largest COI on an optical fiber ring network based at least in part on a preference for the largest calculated Ring COI value.

13. The method of claim 12, further comprising repeating steps (5) through (9) until all demands of the set of demands are either placed on one or more rings of the optical fiber ring network in accordance with step (8) or returned to the queue in accordance with step (9).

14. The method of claim 13, further comprising identifying a demand having the largest Aggregate COI from among a group of demands returned to the queue in accordance with step (9).

15. The method of claim 14, further comprising placing the demand having the largest Aggregate COI from among the group of demands returned to the queue in accordance with step (9) on a ring of the optical fiber ring network based at least in part on a Distance Calculation.

16. An apparatus for creating an optical fiber network topology comprising:
- a processor; and
- a memory for storing data coupled to the processor, the memory comprising a queue comprising a set of demands comprised of previously routed demands and at least one un-routed demand, each demand of the set of demands comprising endpoints,
- wherein the processor is configured for:
  - removing the at least one un-routed demand from the queue and comparing endpoints of the at least one un-routed demand against endpoints of the previously routed demands to determine if any common endpoints are present,
  - calculating one or more Ring Community of Interest (COI) values for the at least one un-routed demand if common endpoints are present, and
  - returning the at least one un-routed demand to the queue if no common endpoints are present.

17. The apparatus of claim 16, wherein the processor is further configured for placing the at least one un-routed demand, if common endpoints are present, on an optical fiber network ring based at least in part on the calculated one or more Ring COI values.

18. The apparatus of claim 16, wherein the processor is further configured for placing the at least one un-routed demand, if common endpoints are not present, on an optical fiber network ring based at least in part on applying a Distance Calculation to the at least one un-routed demand.

19. The apparatus of claim 18, wherein applying the Distance Calculation comprises determining link distances between the endpoints of the at least one un-routed demand and the endpoints of the previously routed demands.

20. The apparatus of claim 19, wherein determining link distances between the endpoints of the at least one un-routed demand and the endpoints of the previously routed demands comprises selecting two shortest link distances.

21. The apparatus of claim 16, wherein the set of demands comprises zero previously routed demands and at least one un-routed demand.

* * * * *